(12) United States Patent
Tanaka et al.

(10) Patent No.: US 6,880,520 B2
(45) Date of Patent: Apr. 19, 2005

(54) DIRECT INJECTION DIESEL ENGINE

(75) Inventors: Tamon Tanaka, Gojo (JP); Setsuo Nishihara, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/695,819

(22) Filed: Oct. 30, 2003

(65) Prior Publication Data
US 2004/0129246 A1 Jul. 8, 2004

(30) Foreign Application Priority Data
Nov. 1, 2002 (JP) .................................. 2002-319319

(51) Int. Cl.⁷ .............................................. F02B 31/00
(52) U.S. Cl. ............................. 123/301; 123/308
(58) Field of Search ............................. 123/301, 302, 123/308

(56) References Cited

U.S. PATENT DOCUMENTS

| | | | | |
|---|---|---|---|---|
| 4,669,434 A | * | 6/1987 | Okumura et al. ........... 123/308 |
| 5,479,889 A | * | 1/1996 | Sato et al. ................... 123/308 |
| 5,720,259 A | * | 2/1998 | Sakurai et al. .............. 123/432 |
| 6,250,281 B1 | * | 6/2001 | Takii et al. .................. 123/308 |
| 6,520,146 B1 | * | 2/2003 | Laimbock ................... 123/308 |
| 6,526,940 B1 | * | 3/2003 | Ichikawa .................... 123/308 |

FOREIGN PATENT DOCUMENTS

| | | |
|---|---|---|
| DE | 19942169 A1 | 3/2000 |
| JP | 7-217437 A | 8/1995 |

* cited by examiner

Primary Examiner—John T. Kwon
(74) Attorney, Agent, or Firm—Birch, Stewart, Kolasch & Birch, LLP

(57) ABSTRACT

In a direct injection diesel engine, front and rear intake openings of each cylinder are arranged along the row direction of the cylinders on one side thereof. A front intake port communicating with the front intake opening is formed to extend from the front intake opening in a direction generally perpendicular to the row direction of the cylinders. A rear intake port communicating with the rear intake opening is formed to be directed to a flow direction of a swirl generated in the corresponding combustion chamber.

6 Claims, 3 Drawing Sheets

DIRECT INJECTION DIESEL ENGINE

CROSS-REFERENCE TO THE RELATED ART

This application incorporates by reference the subject matter of Application No. 2002-319319, filed in Japan on Nov. 1, 2002, on which a priority claim is based under 35 U.S.C. §119(a).

BACKGROUND OF THE INVENTION

1. Field of the Invention

The present invention relates to the structure of intake ports of a direct injection diesel engine.

2. Description of the Related Art

Recently, fuel injection systems of diesel engines have been improved, and thus fuel injection under high pressure has become possible. Therefore, some diesel engines are designed in such a manner that gas taken in each cylinder forms a swirl flow of a reduced degree to thereby improve volumetric efficiency, whereby combustion is realized with the minimum swirl flow. For example, Japanese Patent Application Laid-Open (kokai) No. H07-217437 discloses a technique in which intake ports are disposed in a twisted manner along the cylinder shape, to thereby decrease the degree of swirls and improve volumetric efficiency.

However, in the technique described in the above-described Japanese Patent Publication, since two intake ports of each cylinder are disposed in a twisted manner, the structure of a valve drive mechanism becomes complicated.

In order to solve the above-mentioned problem, there has been proposed a structure in which two intake openings of each cylinder of the engine are disposed parallel to a direction of row of the cylinders (see, for example, German Patent Publication No. DE19942169). In that structure, intake ports communicating with the intake openings are formed to have a straight shape, and are directed to extend along a tangential direction of the corresponding cylinder. Therefore, the valve drive mechanism is prevented from becoming complicated, and the degree of swirls is decreased in order to realize efficient combustion by means of the improved volumetric efficiency.

However, in the technique disclosed in the German Patent Publication, since the intake ports are formed to extend along a tangential direction of the corresponding cylinder, there has arisen a problem that intake gas having flown from each intake port into the combustion chamber decreases in flow velocity in the vicinity of the cylinder wall surface, thereby lowering volumetric efficiency. Moreover, since the intake gas passes through the intake opening and flows into the combustion chamber at a position away from the center of the cylinder (in the vicinity of the cylinder wall surface), the technique has a problem in that the rotation moment of the intake gas increases, and thus the degree of swirls becomes relatively high.

SUMMARY OF THE INVENTION

The present invention was accomplished in view of the above-mentioned problems, and an object of the present invention is to provide a direct injection diesel engine which does not render the structure of a valve drive system complicated, which does not decrease the flow velocity of intake gas flowing from each intake opening, and which can reduce the rotation moment of the intake gas.

In order to achieve the above object, the present invention provides a direct injection diesel engine comprising a fuel injection element for injecting fuel directly to each combustion chamber of a plurality of cylinders arranged in a row, and a cylinder head having first and second intake openings and first and second intake ports formed therein. The first and second intake openings are arranged along a direction of row of the cylinders (hereinafter also referred to as the "row direction of the cylinders") and opened to the corresponding combustion chambers on one side of the row of cylinders. The first and second intake ports communicate with the first and second intake openings, respectively. The first intake port for each cylinder extends from the corresponding first intake opening in a direction generally perpendicular to the row direction. The second intake port for each cylinder is directed to a flow direction of a swirl generated in the corresponding combustion chamber.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE INVENTION

A direct injection diesel engine according to an embodiment of the present application will now be described with reference to the drawings. Notably, in the following description, the terms "front" and "rear" are used for the sake of convenience; however, these terms do not necessarily mean the "front side" and "rear side" of the vehicle, and may mean front and rear, left and right, etc., depending on the orientation of the engine.

Figure 1:
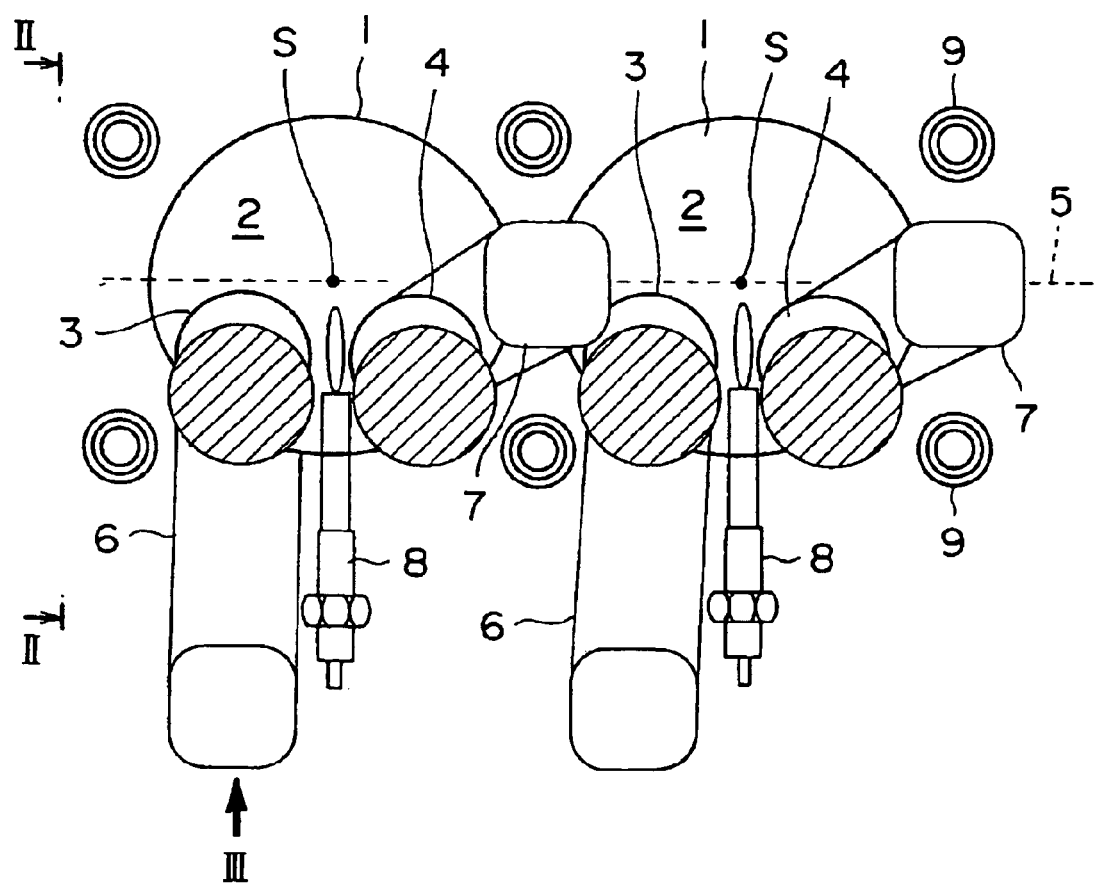
FIG. 1 is a plan view of a main portion of a direct injection diesel engine according to an embodiment of the present invention.

As shown in FIG. 1, the direct injection diesel engine according to the present embodiment has a plurality of cylinders 1 (only two cylinders are shown in FIG. 1). A cylinder head C/H of the engine forms a portion (top wall) of a combustion chamber 2 of each cylinder 1. In the cylinder head C/H, a front intake opening (first intake opening) 3 and a rear intake opening (second intake opening) 4 are formed for each cylinder 1. The front intake opening 3 and the rear intake opening 4 are arranged along the row direction of the cylinders 1 and opened to the combustion chamber 2 on one side (lower side in FIG. 1) of a plane containing the center axes S of the cylinders 1 (a plane indicated by a broken line 5 in FIG. 1 and extending perpendicular to the sheet of FIG. 1).

Moreover, in the cylinder head C/H, a front intake port (first intake port) 6 and a rear intake port (second intake port) 7 are formed for each cylinder. The front intake port 6 is connected to the front intake opening 3 at one end, and is opened to the outside of the cylinder head C/H at the other end. The rear intake port 7 is connected to the rear intake opening 4 at one end, and is opened to the outside of the cylinder head C/H at the other end. These front and rear intake ports 6 and 7 are formed in a straight shape, and communicate with the combustion chamber and the intake openings 3 and 4, respectively.

Unillustrated fuel injection valves are disposed on the cylinder head C/H for the respective cylinders, and pressurized fuel is injected directly into the combustion chambers 2 by means of fuel injection elements such as the fuel injection valves. Moreover, glow plugs 8 to be used at the time of cold start or the like and intake valves 10 for opening and closing the front intake openings 3 and the rear intake openings 4 are provided on the cylinder head C/H.

Notably, the cylinder head C/H is secured to an unillustrated cylinder block by use of cylinder head bolts 9. The cylinder head bolts 9 are arranged in such a manner that a first row of the cylinder head bolts 9 is formed on one side (lower side in FIG. 1) of the row of cylinders 1 and a second row of the cylinder head bolts 9 is formed on the other side (upper side in FIG. 1) of the row of cylinders 1. Each of the bolts 9 in the first row (except for the endmost bolts) is located between adjacent cylinders, and is aligned with the corresponding bolt in the second row in a direction perpendicular to the row direction of the cylinders.

The front intake port 6 of each cylinder 1 is formed to extend, generally perpendicularly to the row direction of the cylinders 1, from the front intake opening 3 toward one side of the cylinder 1 on which the front intake opening 3 and the rear intake opening 4 are present (lower side in FIG. 1; i.e., one side of the plane 5 including the center axes S of the cylinders on which the front intake opening 3 and the rear intake opening 4 are present).

The rear intake port 7 of each cylinder 1 is formed to be directed toward the direction of a swirl flow generated in the combustion chamber 2; i.e., the rear intake port 7 is directed toward a direction which corresponds to the flow direction of a swirl flow and does not hinder the swirl flow. Specifically, the rear intake port 7 is formed on the rear side (right-hand side in FIG. 1) in such a manner that the rear intake port 7 extends toward the rear intake opening 4 from a space between the corresponding two cylinder head bolts 9 disposed in the first and second bolt rows; i.e., disposed on the opposite sides of the row of cylinders.

Notably, depending on the installation positions of the cylinder head bolts 9, the rear intake port 7 may be formed to extend along a direction generally parallel to the row direction of the cylinders 1.

Figure 2:
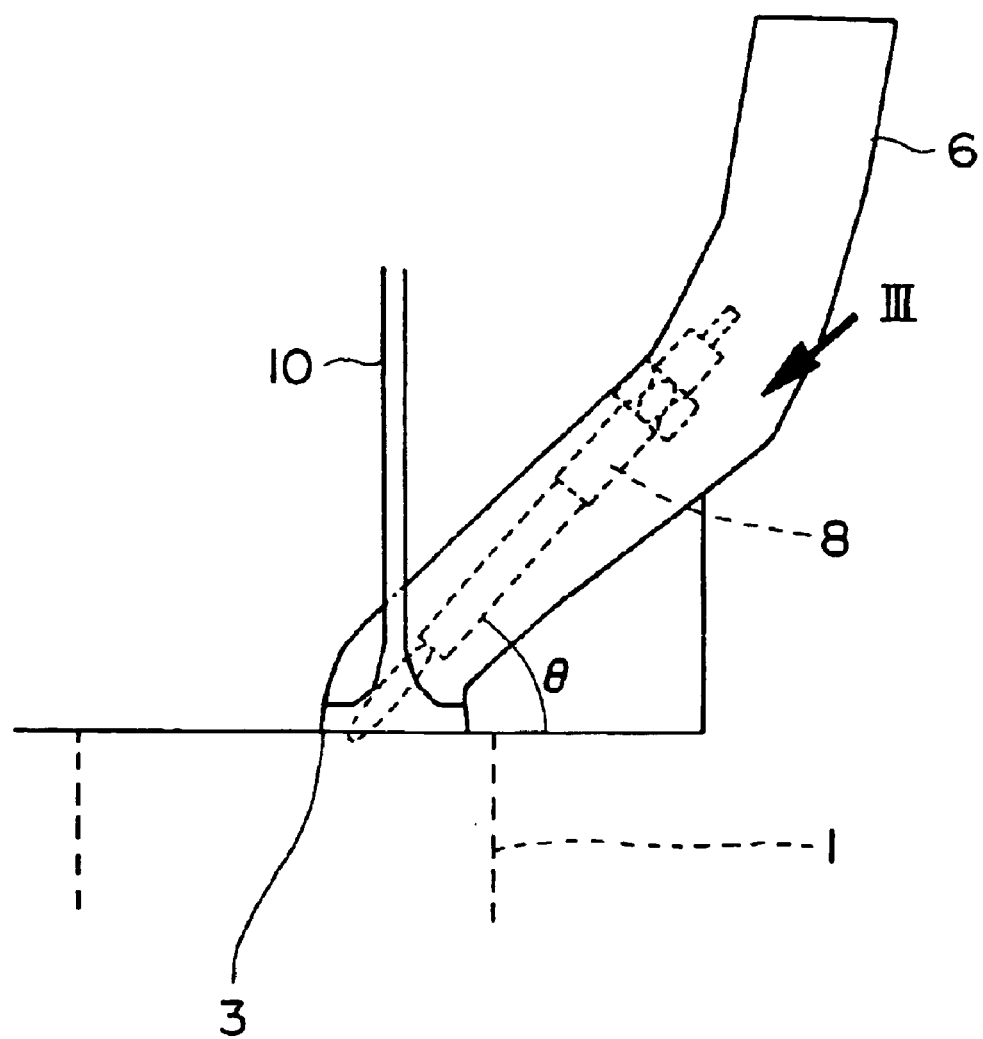
FIG. 2 is a view taken along line II—II in FIG. 1.
Figure 3:
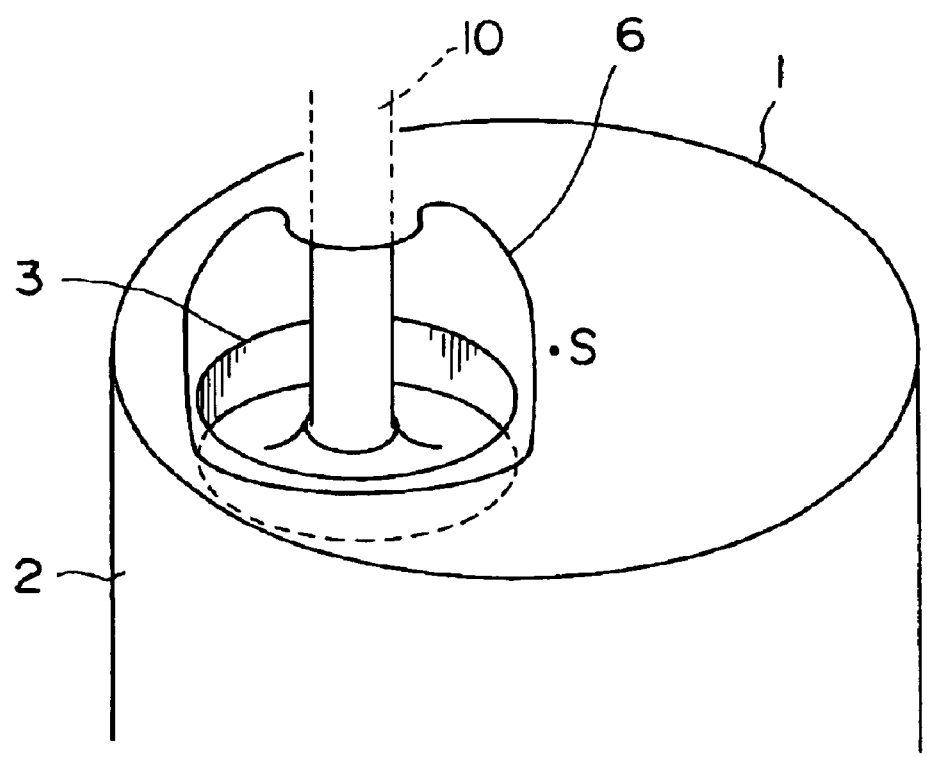
FIG. 3 is a view as viewed along direction III in FIGS. 1 and 2.

As shown in FIG. 1, each front intake port 6 is formed to extend along a direction generally perpendicular to the row direction of the cylinders 1. This enables the glow plug 8 to be mounted, on the cylinder head C/H, generally parallel to the front intake port 6, to thereby avoid interference between the glow plug 8 and the front intake port 6. Therefore, as shown in FIG. 2, the glow plug 8 can be mounted at an installation angle θ (with respect to the lower surface of the cylinder head C/H) which is similar to that of the front intake port 6 or is closer to a right angle. Therefore, a wall portion between the lower surface of the cylinder head C/H and a hole into which the glow plug 8 is inserted can have a sufficient thickness, whereby the strength of the cylinder head C/H can be secured.

In the direct injection diesel engine having the above-described structure, the front intake opening 3 and the rear intake opening 4 are formed in such a manner that they are opened to the combustion chamber 2 at locations on one side (lower side in FIG. 1) of the row of cylinders 1; i.e., the plane including the center axes S of the cylinders 1 (the plane indicated by a broken line 5 in FIG. 1) and extending perpendicular to the sheet of FIG. 1). Therefore, the structure of the valve drive system for opening and closing the intake valves 10 is prevented from becoming complicated.

Moreover, since the front intake port 6 and the rear intake port 7, which are connected the front intake opening 3 and the rear intake opening 4, respectively, are formed straight, the intake resistance is low, and thus the volumetric efficiency is high.

Moreover, the front intake opening 3 is disposed such that it is separated from the cylinder wall surface of the cylinder 1 in the row direction of the cylinders 1, and the front intake port 6 is formed straight to extend in a direction generally perpendicular to the row direction of the cylinders 1. Therefore, intake air passing through the front intake port 6 flows into the combustion chamber along a direction generally perpendicular to the row direction of the cylinders 1, toward a region that is offset from the cylinder wall surface of the corresponding cylinder 1 toward the center axis S thereof. Therefore, the flow velocity of the intake air does not drop in the vicinity of the cylinder wall surface, whereby high volumetric efficiency is attained.

Furthermore, since the rear intake port 7 of each cylinder 1 is formed to be directed toward the direction of a swirl flow generated in the combustion chamber 2, a swirl flow is appropriately generated within the combustion chamber 2. However, since the intake air passing through the front intake port 6 flows into the combustion chamber along a direction generally perpendicular to the row direction of the cylinders 1 and reaches a region offset from the cylinder wall surface of the corresponding cylinder 1 toward the center axis S thereof, the rotational moment of the swirl flow is suppressed from increasing, whereby the degree of swirls is reduced.

In the case where the rear intake port 7 is formed to extend along a direction generally parallel to the row direction of the cylinders 1, even the intake air from the rear intake port 7 does not decrease in flow velocity in the vicinity of the wall surface, and thus, the rotation moment decreases. Therefore, both a reduced degree of swirls and high volumetric efficiency are achieved.

As described above, a direct injection diesel engine according to the present invention comprises a fuel injection element for injecting fuel directly to each combustion chamber of a plurality of cylinders arranged in a row, and a cylinder head having first and second intake openings and first and second intake ports formed therein. The first and second intake openings are arranged along the row direction of the cylinders and opened to the corresponding combustion chambers on one side of the row of cylinders. The first and second intake ports communicate with the first and second intake openings, respectively. The first intake port for each cylinder extends from the corresponding first intake opening in a direction generally perpendicular to the row direction. The second intake port for each cylinder is directed to a flow direction of a swirl generated in the corresponding combustion chamber. Therefore, the direct injection diesel engine according to the present invention does not render the structure of the valve drive system complicated, does not decrease the flow velocity of intake gas flowing from the intake opening to the combustion chamber, and can reduce the rotation moment of the intake gas. As a result, reduced swirl flows and high volumetric efficiency are achieved.

When the second intake port is formed to extend along a direction generally parallel to the row direction of the cylinders, inflow gas from the second intake port straightly flows into the combustion chamber, whereby the volumetric efficiency can be further improved.

What is claimed is:
1. A direct injection diesel engine, comprising:
a fuel injection element for injecting fuel directly to each combustion chamber of a plurality of cylinders arranged in a row;

a cylinder head having first and second intake openings and first and second intake ports formed therein, the first and second intake openings being arranged along the row direction of the cylinders and opened to the corresponding combustion chambers on one side of the row of cylinders, and the first and second intake ports communicating with the first and second intake openings, respectively, wherein the first intake port for each cylinder extends from the corresponding first intake opening in a direction generally perpendicular to the row direction; and a second intake port communicating with the second intake opening, the second intake port for each cylinder being directed to a flow direction of a swirl generated in the corresponding combustion chamber and extending along a direction generally parallel to the row direction.

2. A direct injection diesel engine according to claim 1, wherein the first intake port and the second intake port are formed straight.

3. A direct injection diesel engine according to claim 1, wherein the first intake opening is located away from a cylinder wall surface of the corresponding cylinder.

4. A direct injection diesel engine according to claim 1, wherein the cylinder head is fixed to a cylinder block by cylinder head bolts disposed on a first side of the row of cylinders and cylinder head bolts disposed on a second side of the row of cylinders, and the second intake port extends toward the second intake opening from a space between two cylinder head bolts disposed on the first and second sides, respectively, of the row of cylinders.

5. A direct injection diesel engine according to claim 1, wherein the first intake port is formed parallel to a glow plug mounted on the cylinder head as viewed from the center axis of the corresponding cylinder.

6. A direct injection diesel engine according to claim 1, wherein the fuel injection element injects pressurized fuel into the combustion chamber.

* * * * *